US006968383B1

(12) United States Patent
Heutschi et al.

(10) Patent No.: US 6,968,383 B1
(45) Date of Patent: Nov. 22, 2005

(54) METHOD FOR BROADCASTING ADDRESSED DATA TO A PLURALITY OF USERS

(75) Inventors: Walter Heutschi, Jegenstorf (CH); Rudolf Ritter, Zollikofen (CH); Hanspeter Bouquet, Hinterkappelen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/673,373

(22) PCT Filed: Jul. 17, 1998

(86) PCT No.: PCT/CH98/00148

§ 371 (c)(1),
(2), (4) Date: Oct. 16, 2000

(87) PCT Pub. No.: WO99/55050

PCT Pub. Date: Oct. 28, 1999

(51) Int. Cl.$^7$ ............................................. G06F 15/16
(52) U.S. Cl. ...................... 709/228; 709/203; 709/206; 709/217; 709/218; 709/227; 709/229; 709/231
(58) Field of Search ............................... 709/200–253

(56) References Cited

U.S. PATENT DOCUMENTS

| | | | |
|---|---|---|---|
| 4,910,765 A * | 3/1990 | Matsuse et al. ........ | 379/100.09 |
| 5,592,626 A | 1/1997 | Papadimitriou et al. | |
| 6,151,491 A * | 11/2000 | Farris et al. ............. | 455/412.2 |
| 6,151,497 A * | 11/2000 | Yee et al. .................... | 455/430 |
| 6,438,217 B1 * | 8/2002 | Huna ...................... | 379/88.14 |
| 6,442,598 B1 * | 8/2002 | Wright et al. ............... | 709/217 |
| 6,522,875 B1 * | 2/2003 | Dowling et al. ......... | 455/414.3 |
| 6,597,891 B2 * | 7/2003 | Tantawy et al. ........... | 455/3.05 |
| 2002/0124055 A1 * | 9/2002 | Reisman ..................... | 709/218 |
| 2003/0051136 A1 * | 3/2003 | Curtis et al. ................ | 713/163 |

FOREIGN PATENT DOCUMENTS

| WO | WO 96/25006 | 8/1996 |
|---|---|---|
| WO | WO 98/03928 | 1/1998 |
| WO | WO 98/28900 | 7/1998 |

* cited by examiner

*Primary Examiner*—Nabil El-Hady
(74) *Attorney, Agent, or Firm*—Oblon, Spivak, McClelland, Maier & Neustadt, P.C.

(57) ABSTRACT

Method for broadcasting addressed data to a multiplicity of users via various broadcasting channels. The method includes setting up at least one information data base, which contains data that are intended to be transmitted through at least one of the broadcasting channels, the stored data from a multiplicity of information suppliers being transmitted through at least one communication channel into the information data base, storing of transmission criteria for each user or each user group, the transmission criteria including indications about the data from the information data base that have to be transmitted to each user or each user group, as well as an indication about the selected broadcasting channel, and automatic selection of the data to be transmitted according to the stored transmission criteria, and transmission of this data to the user or to the user group through the selected broadcasting channel.

46 Claims, 2 Drawing Sheets

METHOD FOR BROADCASTING ADDRESSED DATA TO A PLURALITY OF USERS

BACKGROUND OF THE INVENTION

1. Field of the Invention

The present invention relates to a method and a system for broadcasting data to users through a multiplicity of addressed broadcasting channels.

2. Discussion of the Background

In the state of the art, data from one or more servers in a telecommunications network, in particular multimedia data, are transmitted to the users either in pull mode or in push mode. In pull mode, the data remain stored in the server until a user downloads them in a terminal via a telecommunications network. This type of transmission thus requires the active participation of the user, who has to search for the necessary data himself and decide which information he would like to receive.

This active search is only possible, however, if the data are transmitted over a bidirectional telecommunications network, for example over the public telephone network. Furthermore, a minimum amount of computer science knowledge and a not insignificant expenditure of time is required to find relevant data.

In the push mode (broadcasting), the data are transmitted from a server to all user terminals at the same time, which terminals receive these data passively. Depending upon channel type, these data can either be filtered and temporarily stored in the terminal of the user or can be shown immediately or passed on. Most broadcasting systems are purely monodirectional and therefore have no backward channel by means of which the user can reply to the transmitter. That is the case, for example, in the common radio and television broadcasting systems. If the recipient, for example the radio listener or the television viewer, would like to react to a broadcast or to a commercial, he therefore has to access another telecommunications system, for example his telephone. This procedure is extremely inconvenient and error-prone. The common broadcasting systems are thus only partially suitable for motivating users to make spontaneous purchases during or immediately after a commercial. The teletext system or DAB (Digital Audio Broadcasting) system can be mentioned, for example, as digital broadcasting channels.

Bidirectional push channels have recently come into being which have a supplementary backward channel. In particular, multimedia data are being transmitted more and more frequently via the Internet in push mode. In this case the users can reply to the information suppliers by e-mail.

In the usual push systems, the same, entire program is transmitted to all users from one or more servers. Each user terminal in this case includes a filter by means of which only that data which interest the user are stored or displayed. For example, if a complete information program is transmitted to a recipient, he decides to store or display only the information on sports or politics. Use of the bandwidth of the channel is thus not optimal: data are transmitted also to users who are not interested in them. Moreover the users have to wait until the information they are interested in is sent.

The usual data broadcasting systems are dependent upon a particular broadcasting channel. The user must therefore be equipped with a suitable terminal in order to be able to access the information of a particular information supplier. The user generally does not have the possibility, however, of selecting a terminal of any desired type in order to access the data of a particular information supplier. Vice-versa, the information supplier cannot easily broadcast his collection of information through different broadcasting channels.

In the printed patent specification U.S. Pat. No. 5,592,626, a network system is described for the transmission of multimedia programs to a multiplicity of users, the transmission taking place at points in time specified beforehand by the users. According to the teaching of U.S. Pat. No. 5,592,626, the transmission times specified by the users are received by a scheduler, who established in each case a network server path via which a multimedia program selected by a respective user is transmitted efficiently and at the specified point in time to the respective user, the network servers receiving the multimedia programs, temporarily storing them in a cache memory, and passing them on directly to a respective user or to a further network server.

Described in the patent application WO 98/03928 is a web server system which receives digital documents, for example e-mail messages or fax messages, from respective terminals, converts the received digital documents into documents of HTML format (hypertext markup language) and stores the HTML documents in a data base, which can be looked at by users via the Internet, the HTML documents being transmitted to the users over the Internet.

SUMMARY OF THE INVENTION

It is therefore an object of the present invention to offer a data broadcasting system which avoids these drawbacks.

This object is attained, according to the invention, with the aid of a method and of a system having the features of the respective independent claims, preferred embodiments being cited in the dependent claims.

BRIEF DESCRIPTION OF THE DRAWINGS

The invention will be better understood with the aid of the description, given by way of example, and illustrated by the figures, whereby.

DESCRIPTION OF THE PREFERRED EMBODIMENTS

Figure 1:
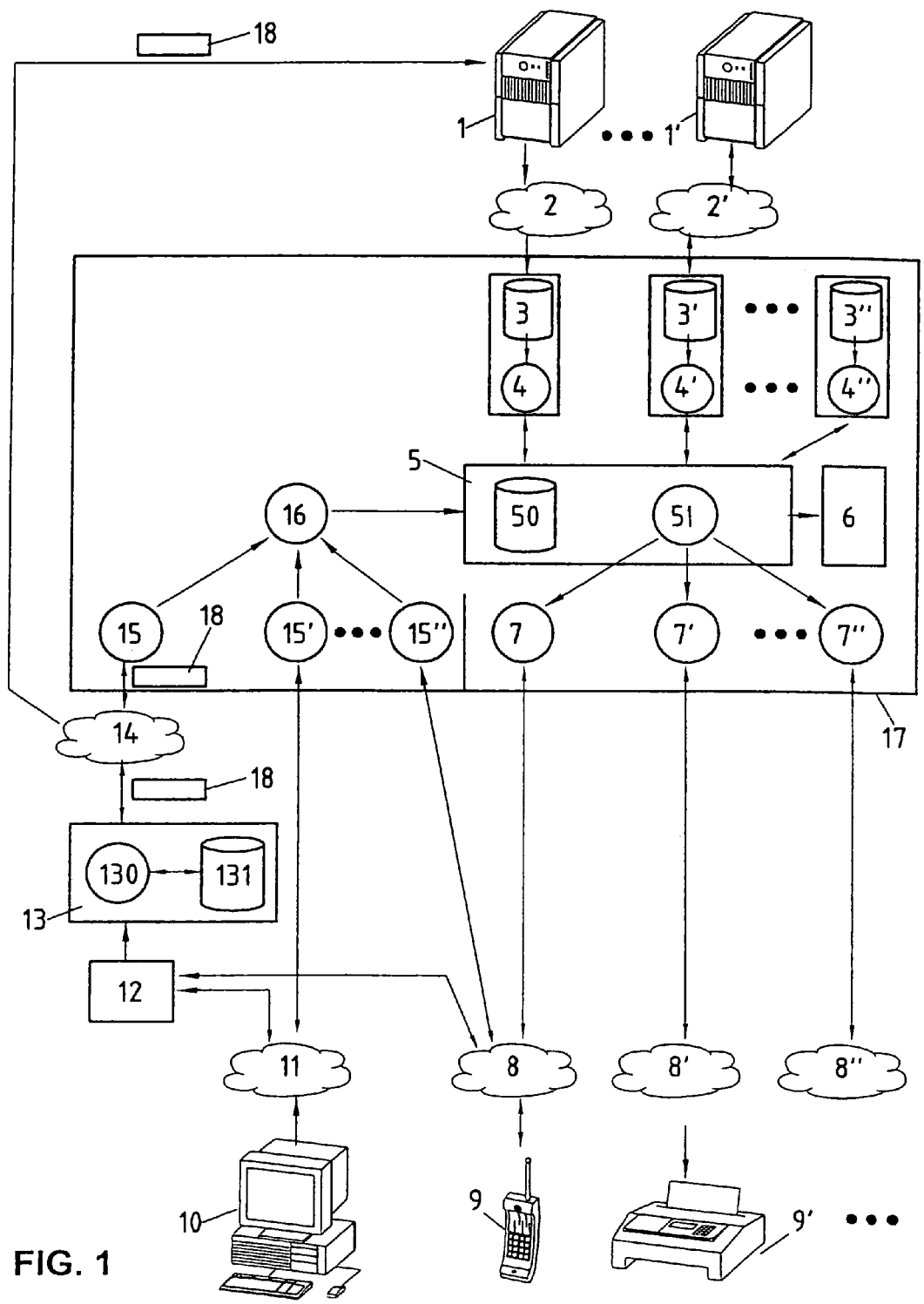
FIG. 1 is a diagrammatic view of the system according to the invention.

Designated by 1, 1', . . . are various servers of different information suppliers. A news agency, a stock market institution, a weather service, a newspaper, a firm, a product supplier, etc., can fulfil the role of the information provider. These suppliers have available one or more servers 1, 1', . . . of different types in which information made available is filed according to different storage standards. The data broadcasting system 17 of the present invention can access these data through one or more networks 2, 2', . . . , for example as FTP data via Internet. The data transmission between the servers 1 and the system 17 can also take place, however, via other networks, for example as teletext page, as DAB, FM-Swift or FM-DARC-radio-program-accompanying data, through a television or radio channel, by normal mail, in the push mode or in the pull mode, etc.

The received data are then filed in the information data bases 3, 3', . . . in the data broadcasting system 17. The system 17 preferably consists of a specially programmed data processing unit with access to different telecommunications systems 2, 8. In this example, one data base 3, 3', 3"

per information supplier is provided; it would also be possible, however, to provide one data base in which data from several or all information suppliers 1, 1', . . . would be filed. The system 17 can also include a data base 3" or a data base area in which internal information of the system operator 17 is filed.

Depending upon the information service 1, the respective data base 3 can comprise a complete copy of the data offered in structured form, for example a complete copy of a web site or only a link to these data, or in most cases only an excerpt from these data. In this case filter means (not shown) are preferably provided to sort out only the relevant data from a service provider. In a variant, the system 17 can automatically search in the various telecommunications networks 2, 2' at different information suppliers based on user criteria. For example, all information about a sports team or about the value of a stock are automatically searched for in the Internet by the system 17, if at least one user has ordered these data. Different search means and search engines can be used for this purpose; search agents (so-called bots) can also be used for this purpose.

The filed data in the data bases 3, 3', . . . are then disseminated to the users by means of the information dispatcher 5. The information dispatcher comprises a data base 50 which contains the transmission criteria for the information filed in the data bases 3, 3', 3", . . . A module 51 checks the transmission criteria, and generates corresponding transmission schedules for broadcasting the data to the users. The transmission criteria are entered by the users themselves, and determine which data have to be transmitted to which users or user groups when and according to which criteria.

The users can define, for example, at least the following transmission criteria:

The category of the desired information (for example: "I want to receive all information on this sports team")

Optionally, a special data service (for example: "I want all information from the weather service")

Transmission time criteria (for example: "I want to receive this data this evening between 7 and 9 p.m.")

Transmission periodicity criteria (for example: "I want to receive these data every evening between 7 and 9 p.m.")

Event criteria (for example: "I want to be informed immediately if a sports team wins a game or if a stock exceeds a certain value)

A broadcasting channel over which this information has to be transmitted (for example as e-mail, as SMS message for a mobile radio device, as messages for a pager network, as DAB data, etc.)

The validity (for example between January 1998 and January 1999).

Etc.

These transmission criteria are linked in the data base 50 with the address of the user to whom the data have to be transmitted. A list of user addresses can preferably be entered, for example a list of all members of an association or a firm, who are supposed to receive certain data. The transmission of advertisements to all users or to larger user groups can thereby be programmed, for example. Depending upon the broadcasting channel, the user address can be formulated differently; it corresponds, for example, to the IMSI (international mobile subscriber identity) or to the MSISDN (mobile subscriber identification number) of the user in the case of a SMS message, an e-mail address in the case of an e-mail, a normal mailing address in the case of a normal mail dispatch, etc.

Transmission criteria can preferably also be defined for predefined sets of data and information from different information suppliers. For example, a single transmission criterion can be defined for a particular event, for example an exhibition or a cultural event, for transmitting information concerning this event from different information suppliers to all interested parties and to visitors, for example for transmitting a current exhibition program, a timetable, information about parking spaces, etc., to different terminals 9, 9', . . . .

On the basis of the transmission criteria entered, the information dispatcher generates a transmission schedule for each output driver 7, 7', 7". Each transmission schedule comprises a list of data (or of links to these data) obtained from the data bases 3, 3', 3", as well as transmission criteria and a user address for these data. The data are adapted and formatted each depending upon the output driver. The different transmission schedules are generated automatically or manually with the help of an operator; an operator can preferably consult, administrate, or respectively change the generated transmission schedule also in the case of an automatically generated transmission schedule.

Not all data can be transmitted through all available channels. Multimedia data can be sent as e-mail, for example, but possibly not as a message for every pager device. Moreover the bandwidth of the different broadcasting channels, of the users and of the information dispatcher 5 is not unlimited so that certain data possibly cannot be transmitted or cannot be transmitted at the requested point in time. The module 51 therefore carries out checks to detect these conflicts and to resolve them automatically, if possible, in that many data are postponed in the transmission schedule, for example, or are shifted into another transmission schedule corresponding to another channel. If, owing to certain data, the module 51 cannot resolve a bandwidth conflict, these data are not entered in the transmission schedule, and the user is informed, for example by an e-mail through a free channel.

The following plausibility checks are carried out when data are entered into a transmission schedule:

Size of the data: data which are larger than a predefined size in bytes cannot be entered into a transmission schedule;

Maximal resolution in the case of a picture object which may not exceed the resolution of the terminal 9, 9', . . . .

Format of the data which must be compatible with the terminal.

The module 51 attempts to take into consideration all entered transmission criteria of all users when creating transmission schedules. These transmission schedules are then carried out by respective output drivers 7, 7', 7" in order to transmit the selected data through the various broadcasting channels. The execution of a transmission schedule corresponds to the transmission of indicated data to the user or to the user group if the indicated transmission criteria are fulfilled, for example at the indicated point in time or for a event-controlled transmission criterion when an external event is recognized.

The system 17 preferably contains output drivers in order to be able to transmit the selected data in the following formats through all or several of the following channels:

As digital messages to mobile radio telephones (9) through a cellular digital mobile radio network (8), or as e-mail to a WAP (Wireless Application Platform)—compatible mobile device;

As pager messages through a pager network;

As e-mail through Internet or through another telecommunications network;

As a radio program-accompanying service in a DAB radio program (e.g. DAB, FM-Swift or FM-DARC);

As a teletext page in a teletext system;

As fax through an ISDN network or through the public telephone network;

As a letter by normal mail;

As a picture on display panels or on screens,

As a verbal message on a telephone, for example with a speech synthesizer;

Etc.

Depending upon the broadcasting channel, the output driver 7, 7', 7" can comprise completely different components. In the case of transmission as e-mail, as short message or through a mobile radio network, or for example as fax, the output driver can consist of a modem and suitable software means. In the case of transmission as a letter for the mail, the dissemination can also comprise manual operations, for example writing the letter and putting stamps on the envelopes.

The transmitted data are sent to the indicated user via a corresponding channel 8, 8', 8" and are received on a terminal 9, 9', . . ., for example on a mobile device, on a fax machine, as e-mail on a computer, etc. The transmitted data can contain a simple text content or also a multimedia content. In the latter case, the data can also contain multimedia objects, for example sound data, still or moving pictures, etc., instead of, or in addition to, text messages.

The system 17 preferably comprises a billing module 6 to bill the transmission of data to the users. This billing can depend, for example, on the quantity of transmitted data, on the transmission time, on the number of transmission criteria, on the quantity or the type of requested information, etc. Users can preferably also subscribe to certain standard services, for example daily weather forecasts. The billing can be carried out, for example, by invoice, by credit card, by telephone bill, by debiting an account with the system operator, etc. Part of the paid amount can preferably be reimbursed to the information supplier 1 at least in many cases.

The users can preferably access the data base 50 through different channels to administrate the transmission criteria. For this purpose the system preferably has different input drivers 15, 15', 15", etc. A module 16 controls these different drivers, and forms a unified interface to the information dispatcher 5. The transmission criteria can be administered, for example, via Internet (11); in this case the corresponding input driver comprises preferably a web server. The user can enter the required criteria on his computer 10 with a suitable form, the form preferably carrying out already some formal and coherence checks. The user can preferably establish the transmission criteria also by letter or by telephone.

The user can define transmission criteria for himself. Optionally, he can also enter transmission criteria for other indicated users or user groups, with or without authorization of these users. For example, a firm can enter a list of potential clients who must receive a particular advertisement, or an exhibition organizer can have the information relevant for visitors broadcast to all interested parties or to all ticket purchasers in this way.

The transmission criteria in the data base 50 can preferably be administered also with special messages, for example with SMS or USSD messages prepared in a mobile device 9. These messages are transmitted, for example, via a GSM mobile radio network 8 and a short message service center SSC (not shown).

Figure 2:
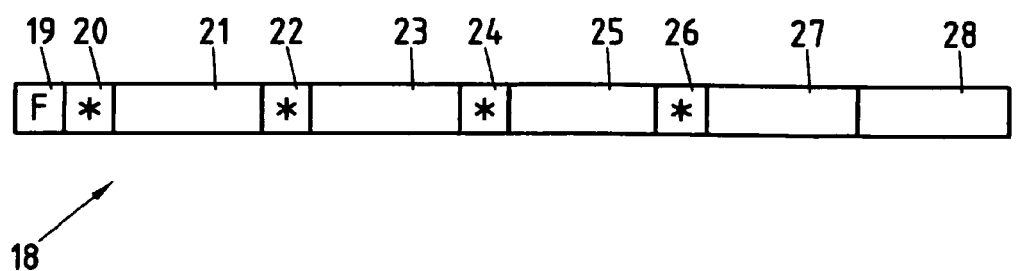
FIG. 2 shows the format of an order code.

According to the invention, the transmission criteria can also be entered and administered by means of standardized order codes 18. FIG. 2 shows such an order code as an example. As explained below, the format of the order code is defined in a fixed way and makes possible, for example, the ordering of products or services at different suppliers, besides the administration of transmission criteria. The patent application WO 98/28900 describes a possible format for order codes. Order codes contain several fields, the format of which is standardized, and which are designated by the reference symbols 19 to 28. The field 19 contains a header, and indicates that what is involved here is actually an order code. In the simplest case, the header comprises only one single ASCII in this case the letter F. The second field 20 is a pre-defined field delimiter, here an asterisk, in order to separate other fields. The next field 21 contains an identification of the supplier: e.g. an abbreviation or a mnemonic code which clearly designates a particular supplier. For this application the field 21 contains a designation which clearly identifies the data broadcasting system 17. This supplier identification can comprise, for example, a country designation which indicates in which country this supplier is primarily active.

The field 22 contains a second field delimiter, in this example again the symbol *. The next field 23 comprises a product identification. Indicated by this abbreviation or designation chosen by a supplier is a particular product in the range of this supplier. In this case this field corresponds preferably to an identification of the transmission criteria-administration service. This field is separated from field 25, which contains a check sum, by a third field delimiter 24. Additional fields 27, 28, separated from field 25 by an additional field delimiter 26, contain the actual transmission criteria, as defined above, as well as an identification of the user or an identification of the terminal 9 on which the data are supposed to be received. Program parts, for example applets in the Java language, or in another object-oriented computer language, can also be transmitted within the fields 27, 28. Menus or lists for the entry of additional parameters can also be defined with these applets, for example.

The fields 19–28 can contain any desired combination of alphanumerical symbols. Each alphanumerical symbol can take on 46 different values, for example—26 letters, 10 numerals and 10 further symbols available on the keyboard of a mobile radio telephone, for example. Further selections of authorized symbols can of course be defined, e.g. in that a differentiation is made between upper and lower case letters. The fields have a variable length; the entire length of the order code can be limited, however, to 48 symbols, for example. In a variant, these fields have a predetermined, fixed length: in this case the field delimiters are not necessary and can be omitted. As a variant, the fields 27, 28 can also contain binary data, for example program parts or objects or links to binary data.

The check sum 25 is established from the fields 21, 23, and possibly 27, 28, through any known error checking and recovery algorithm. For example, a parity check algorithm can be used to establish the value of the check sum 25. The number of symbols in the check sum depends on the algorithm used and on the maximum accepted error quota. This check sum is preferably determined by the supplier, here by the operator of the system 17, and must be captured by the user. In this way errors in entering or transmitting an order code can be detected.

To edit an order code 18, the user selects, for example, a corresponding menu option in a suitable program which is carried out by the processor of the input terminal 9, 10. As a variant, the user can also consult, for example, a corresponding Internet page, or can dial a suitable telephone number. In any case, an entry mask, with which he can enter the desired order code, is shown on the screen of the input device.

The fields 27, 28, which contain the actual transmission criteria, are preferably captured in a suitable editing program. This editing program can, for example, be transmitted as an applet, for example a JAVA applet, into the terminal 9,10. When a new order code is edited, this applet is transmitted and executed to facilitate the entry of the transmission criteria and of the address in the fields 27, 28.

Upon actuation of a particular key on the terminal 9, for example the key #, the selected order code is packed in short messages in a suitable software, for example in SMS messages, in USSD data files or as e-mail, and is transmitted through the mobile radio network 8 to a short message service center (SMSC) 12 of the respective network operator. Optionally, the message can be encrypted partially or completely between the terminal 9 and the center 12. The center 12 is moreover connected to a module 13, which comprises, for its part, a user data base 131 in which additional, user-specific parameters are stored. The user data base 131 corresponds, for example, to the subscriber data base with data on all subscribers with the operator of the network 8, for example with the operator of a mobile radio network. The user is identified in the center 12, for example with the aid of the identification given in the header of the received short message, for example with the IMSI in the case of a SMS message; this identification is then used as input criterion for the user data base 131 from which additional user-specific parameters are thereby obtained. These additional parameters comprise, for example, the complete address of the user, his billing address, his access rights, his preferred language, etc. These additional data are then linked by a module 130 to the content of the received order code, and are passed on through the network 14 to the data broadcasting system 17. This system 17 receives then a message which contains all necessary transmission criteria as well as a complete identification of the user. These messages are preferably processed by a suitable input driver 15, which checks the transmission criteria with the aid of the module 16, and possibly files them in the data base 50.

The entry of transmission criteria with such order codes can also comprise a bidirectional conversation. If the transmission criteria are not complete, or if the ordered data cannot be sent out at the desired time, the input driver 15 in this case can request a new order code or propose a new order code itself.

Preferably such predefined order codes can also be contained in the data transmitted by the system 17. For example, a transmitted advertisement or other information can contain such an order code which the recipient can pass on if he would like to receive additional information on a particular product, for example, or particular information regularly or at intervals. The user can also order the retransmission of a transmission with this service, for example.

Order codes can also be transmitted directly to the information suppliers 1 or to the product or service provider. In this case, the field 21 in the order code must contain an identification of this supplier in order to be automatically passed on to this supplier by the module 13. The field 21 preferably contains only an abbreviation of the supplier name which is supplemented by the module 13 by means of a supplier data base (not shown) in order to make possible a passing on to the supplier. Such order codes can contain a product or service order, for example; the user can thereby order products or information on products directly at the supplier 1, for example.

What is claimed is:

1. A method for broadcasting addressed data to a plurality of users, comprising:
providing at least one information data base that includes data to be transmitted through a broadcast channel;
storing transmission criteria, wherein the transmission criteria includes an address of a user or a user group, as well as an indication of the data from the information data base to be transmitted to the user or user group;
selecting at least one broadcasting channel, through which the selected data are to be transmitted, from among different broadcasting channels, and storing information of the at least one broadcasting channel with the transmission criteria; and
automatically selecting the data to be transmitted according to the stored transmission criteria, wherein
the stored data are obtained from a plurality of external information suppliers; and
the automatically selected data are transmitted through the selected broadcasting channel to the user or to the user group.

2. The method according to claim 1, wherein at least certain of the selected data are transmitted as messages through a cellular digital mobile radio network.

3. The method according to claim 1, wherein at least certain of the selected data are transmitted as messages for paging systems.

4. The method according to claim 1, wherein at least certain of the selected data are transmitted through the Internet as addressed messages, including as e-mail.

5. The method according to claim 1, wherein at least certain of the selected data are transmitted through a teletext channel as a teletext page.

6. The method according to claim 1, wherein at least certain of the selected data are transmitted through a public telecommunications network as a fax.

7. The method according to claim 1, wherein the data is shown on display panels.

8. The method according to claim 1, wherein at least certain of the selected data are multimedia data.

9. The method according to claim 1, wherein at least certain transmitted information comprises at least one order code that recipients pass on directly to a supplier to order products or services.

10. The method according to claim 1, wherein at least certain of the users administrate transmission criteria through at least one telecommunications system.

11. The method according to claim 10, wherein at least certain of the users administrate transmission criteria through the Internet.

12. The method according to claim 10, wherein at least certain of the users administrate transmission criteria with special messages through a mobile radio network.

13. The method according to claim 10, wherein at least certain of the users administrate transmission criteria with standardized order codes through a mobile radio network, the identity of the users being automatically established with a user data base in the mobile radio network.

14. The method according to claim 1, wherein the transmission criteria comprise at least one category of desired information.

15. The method according to claim 1, wherein at least certain of the transmission criteria comprise at least one data service.

16. The method according to claim 1, wherein at least certain of the transmission criteria comprise a standardized set of various data from different information providers.

17. The method according to claim 16, wherein data in the set comprise all the information concerning an exhibition necessary for visitors.

18. The method according to claim 1, wherein at least certain of the transmission criteria comprise transmission time criteria.

19. The method according to claim 1, wherein at least certain of the transmission criteria comprise transmission periodicity criteria.

20. The method according to claim 1, wherein at least certain of the transmission criteria comprise event criteria.

21. The method according to claim 1, wherein at least certain of the transmission criteria indicate certain data that are filed in the information data base only if at least one user has selected the certain data.

22. The method according to claim 1, wherein the transmission of data to the user is billed with a billing system.

23. The method of claim 1, wherein the step of automatically selecting the data to be transmitted is not performed in response to a request for the data by the user or the user group.

24. A data broadcasting system for the broadcasting of addressed data to a multiplicity of users, comprising:
    at least one information data base configured to store data intended to be transmitted through a broadcasting channel;
    a storage area configured to store transmission criteria for each user or each user group, wherein the transmission criteria include an address of a user or a user group, an indication of the data from the information data base to be transmitted to the user or the user group, and information of at least one broadcasting channel selected from among different broadcasting channels through which the data from the information data base are to be transmitted; and
    an information dispatcher configured to automatically select data from the information data base that fulfill the desired transmission criteria of at least one user, wherein
    the data broadcasting system is configured such that data from a plurality of information suppliers are transmitted through at least one communication channel to the information data base,
    the data broadcasting system comprises at least one output driver for transmission of selected data through the selected broadcasting channel to the user or user group.

25. The data broadcasting system according to claim 24, further comprising a plurality of output drivers for transmission of data to the user through a corresponding plurality of transmission channels in accordance with the transmission criteria.

26. The data broadcasting system according to claim 24, wherein said output drivers comprise at least one driver for a cellular digital mobile radio network to transmit selected data as messages to mobile radio telephones.

27. The data broadcasting system according to claim 24, wherein said output drivers comprise at least one driver for a pager network to transmit selected information as pager messages to pager terminals.

28. The data broadcasting system according to claim 24, wherein said output drivers comprise at least one driver for the Internet, to transmit selected information as e-mail.

29. The data broadcasting system according to claim 24, wherein said output drivers comprise at least one driver for a DAB network to transmit selected information as a radio program-accompanying service.

30. The data broadcasting system according to claim 24, wherein said output drivers comprise at least one driver for a teletext system to transmit selected information as a teletext page.

31. The data broadcasting system according to claim 24, wherein said output drivers comprise at least one fax driver to transmit selected information as a fax.

32. The data broadcasting system according to claim 24, wherein said output drivers comprise at least one driver for display panels to display selected information on display panels.

33. The data broadcasting system according to claim 24, wherein at least certain transmitted data are linked with order messages, wherein said order messages are able to be passed on by recipients to a suitable system to request products or services.

34. The data broadcasting system according to claim 24, wherein the transmission criteria in said storage area are configured to be administered by the users through at least one telecommunications system.

35. The data broadcasting system according to claim 34, wherein the transmission criteria in said storage area are configured to be administered by the users by using the Internet.

36. The data broadcasting system according to claim 34, wherein the transmission criteria in said storage area are configured to be administered by the users with special messages through a mobile radio network.

37. The data broadcasting system according to claim 24, wherein the transmission criteria in the said storage area are configured to be administrated by the users with standardized order codes through a mobile radio network, the identity of the users being automatically established in the mobile radio network with a user data base.

38. The data broadcasting system according to claim 24, wherein the transmission criteria comprise at least one data type.

39. The data broadcasting system according to claim 24, wherein at least certain of the transmission criteria indicate at least one data service.

40. The data broadcasting system according to claim 24, wherein at least certain of the transmission criteria comprise a standardized set of various data from different information suppliers.

41. The data broadcasting system according to claim 40, wherein data in the standardized set comprise all the information concerning an exhibition necessary for visitors.

42. The data broadcasting system according to claim 24, wherein at least certain of the transmission criteria comprise transmission time criteria.

43. The data broadcasting system according to claim 24, wherein at least certain of the transmission criteria comprise transmission periodicity criteria.

44. The data broadcasting system according to claim 24, wherein at least certain of the transmission criteria comprise event criteria.

45. The data broadcasting system according to claim 24, wherein at least certain of the transmission criteria indicate data that are stored in the information data base only if at least one user has selected the data.

46. The data broadcasting system according to claim 24, further comprising a billing system to bill the transmission of information to the user.

* * * * *

UNITED STATES PATENT AND TRADEMARK OFFICE
CERTIFICATE OF CORRECTION

PATENT NO. : 6,968,383 B1
DATED : November 22, 2005
INVENTOR(S) : Heutschi et al.

It is certified that error appears in the above-identified patent and that said Letters Patent is hereby corrected as shown below:

Title page,
Item [22], PCT Filed, should read -- Apr. 17, 1998 --.

Signed and Sealed this

Thirty-first Day of January, 2006

JON W. DUDAS
*Director of the United States Patent and Trademark Office*